United States Patent [19]
Calabrese

[11] 4,322,849
[45] Mar. 30, 1982

[54] DATA RELAY SYSTEM
[76] Inventor: Frank A. Calabrese, 118 S. Broad, Waynesboro, Pa. 17268
[21] Appl. No.: 140,229
[22] Filed: Apr. 14, 1980
[51] Int. Cl.³ ............................................. H04B 3/36
[52] U.S. Cl. ...................................... 375/3; 364/900; 364/200; 178/70 R
[58] Field of Search .................... 375/3; 364/200, 900; 340/168 A, 168 B; 370/41, 42, 43, 97; 178/70 R

[56]  References Cited
U.S. PATENT DOCUMENTS

| | | | |
|---|---|---|---|
| 3,573,856 | 4/1971 | Best | 364/200 |
| 4,017,841 | 4/1977 | Jensen | 364/900 |
| 4,075,691 | 2/1978 | Davis | 364/200 |
| 4,133,027 | 1/1979 | Hogan | 364/200 |

Primary Examiner—Benedict V. Safourek
Assistant Examiner—Stephen Chin
Attorney, Agent, or Firm—Spencer T. Smith

[57] ABSTRACT

A data relay system transmits addresses from a host device sequentially to each of a plurality of data relays and for transmitting data sequentially through each of the plurality of data relays to the host device. Serial addresses are placed on the data bus by the host device and received by a Signal Conditioner in the data relay and passed through an Address Parallelizer and Address Selector. If the address is recognized by the Address Selector, then a Data Group is counted by the Data Group Counter while the Data Group is enabled. The enabling of a selected Data Group will result a selected parallel data being supplied to the Data Group Serializer which present the parallel data for serial transmission to the host device.

2 Claims, 2 Drawing Figures

Fig_1
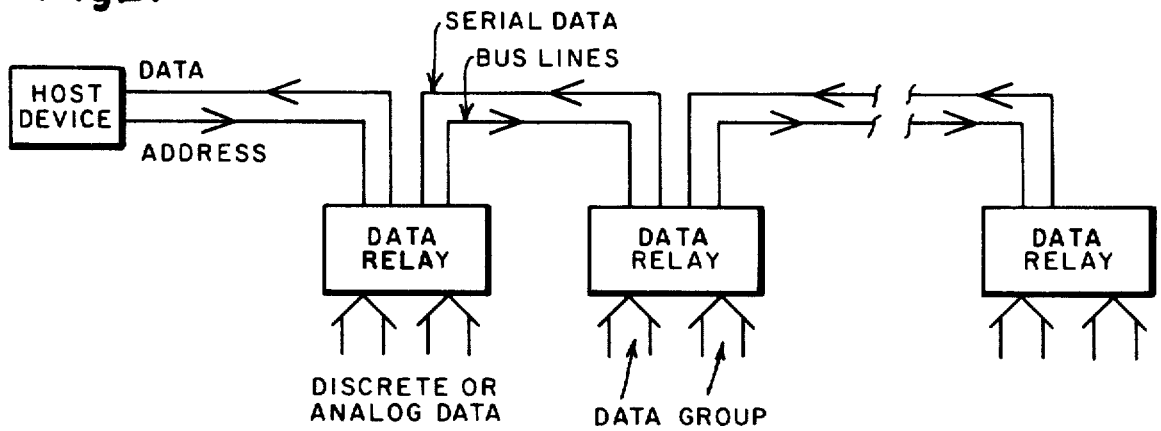
Fig_2
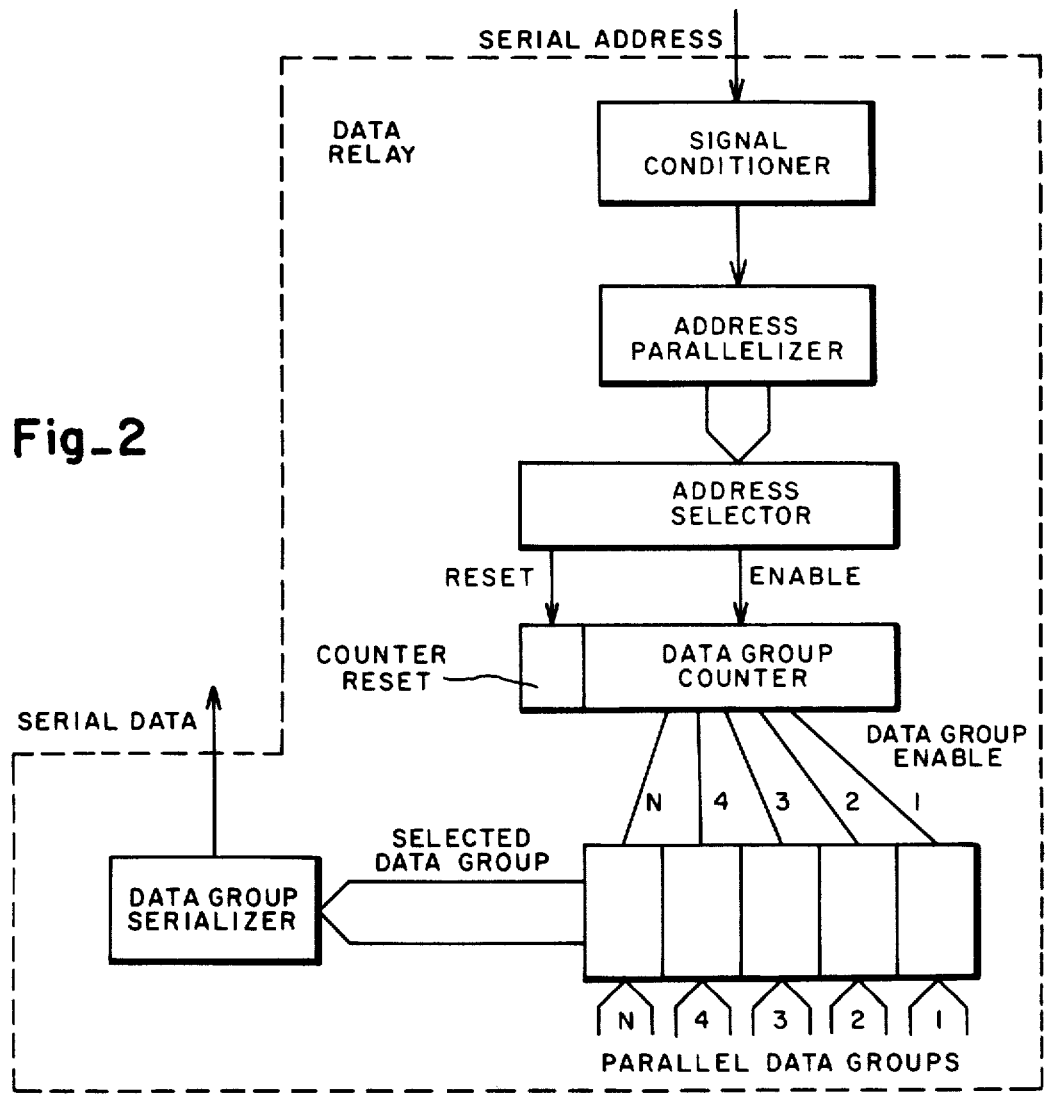

DATA RELAY SYSTEM

The present invention relates to data relay sytems for accessing large quantities of data.

Typical approaches to accessing data by a computer may be parallel or serial. When utilizing the parallel method, a special interface device must be custom designed to the specific requirements of each computer. Each data point must be individually wired to the parallel interface.

Each data bit corresponds to a computer input bit which limits the capacity of the system interface. The parallel interface must be in the vicinity of the computer to reduce the interference effects of electrical noise. When utilizing serial interfacing, each serial channel is customarily interfaced to a single device which preconditions the data electrically. Serial interfacing above the simplest level requires communication protocols by the computer for selecting the correct data. The range of the remote data acquisition is often restricted by the electrical conditioning of the serial line.

It is, accordingly, an object of the present invention to provide a data relay for accessing large quantities of data, of any voltage level, either discrete or analog, from a single source, typically a computer, which eliminates these constraints.

Other objects and advantages of the present invention will become apparent from the following portion of this specification and from the accompanying drawings which illustrate, in accordance with the mandate of the patent statutes, a presently preferred embodiment incorporating the principals of the invention.

Referring to the drawings:

FIG. 1 is a system block diagram for a data relay system made in accordance with the teachings of the present invention; and FIG. 2 is a functional diagram of a data relay illustrated in FIG. 1.

When multiple Data Relay units are connected to a single serial channel, as typified in FIG. 1, each Data Relay sees the address placed on the serial address line. Since each Data Relay has a unique address, only one responds by placing data on the data line.

Serial addresses are placed on the Address Bus shown in FIG. 1 by a Host Device, such as a computer. The serial address is received by a Signal Conditioner shown in FIG. 2. The conditioned serial address is converted to parallel by the Address Parallelizer, which presents the parallel address to the Address Selector. If the address enable is recognized by the Address Selector, then a Data Group is counted (sequenced) by the Data Group Counter while the Data Group is enabled. Enabling a selected Data Group presents that selected parallel data to the Data Group Serializer which presents the parallel data for serial transmission to the Host Device.

Each time the Address Selector enables a Data Group, the Data Group Counter indexes to the next sequential Data Group. This continues until all Data Groups (N) have been selected, then the Data Group Counter resets to the first Data Group. A reset address may also be received by the Data Relay. Upon receipt of the reset address, the Data Group Counter is initialized to the first Data Group.

A most common application of the data relay technique is by addressing and transmitting data in ASCII serial format. Addresses are coded in an 8 bit format and placed upon the address bus. This allows for a maximum of 256 Data Relay units to be connected on the bus. Data Groups organized in this same 8 bit format may be multiplexed 1, 2 or more Groups. If organized in 1 Group, 8 bits of data will be collected by each Data Relay. If 2 Groups, then 16 bits will be collected at each Data Relay, and so forth. Therefore, this provides for the multiplexing of thousands of data bits from a single serial channel.

The invention claimed is:

1. A data relay system comprising
   a host device,
   a plurality of data relays each having a unique address,
   data line means for transmitting addresses from said host device sequentially to each of said plurality of data relays and
   for transmitting data sequentially through each of said plurality of data relays to said host device,
   each of said data relays including
      means for sequencing a plurality of parallel data groups,
      an address selection means for recognizing the address of said data relay transmitted sequentially to each of said plurality of data relays and energizing said sequencing means, and
   means for serializing the parallel data group selected by said sequencing means and for transmitting said selected serialized data group to said data line means whereby the serialized data will be sequentially transmitted through the data relays intermediate the addressed data relay and said host device to said host device.

2. A data relay system according to claim 1, wherein said sequencing means comprises
   counter means for counting the number of times said data relay has been addressed
   the count of said counter, corresponding to a corresponding numbered parallel data group, and
   initializing means for resetting said counter means to a predetermined initial count when a selected reset signal is received.

* * * * *

(12) REEXAMINATION CERTIFICATE (4538th)
United States Patent
Calabrese

(10) Number: US 4,322,849 C1
(45) Certificate Issued: Mar. 5, 2002

(54) DATA RELAY SYSTEM

(75) Inventor: Frank A. Calabrese, 118 S. Broad, Waynesboro, PA (US) 17268

(73) Assignee: Frank A. Calabrese, Waynesboro, PA (US)

Reexamination Request:
No. 90/005,568, Nov. 24, 1999

Reexamination Certificate for:
Patent No.: 4,322,849
Issued: Mar. 30, 1982
Appl. No.: 06/140,229
Filed: Apr. 14, 1980

(51) Int. Cl.[7] .......................... H04B 7/17; H04B 17/02; H04L 25/20
(52) U.S. Cl. ...................... 375/211; 178/70 R
(58) Field of Search .......................... 375/211, 212, 375/213; 178/70 R

(56) References Cited

U.S. PATENT DOCUMENTS

| | | |
|---|---|---|
| 3,336,577 A | 8/1967 | Frielinghaus |
| 3,482,089 A | 12/1969 | Raffel et al. |
| 3,516,063 A | 6/1970 | Arkin et al. |
| 3,573,856 A | 4/1971 | Best et al. |
| 3,575,604 A | 4/1971 | Smith |
| 3,601,806 A | 8/1971 | Heimbigner |
| 3,622,994 A | 11/1971 | Schoenwitz |
| 3,812,462 A | 5/1974 | Crossland et al. |
| 3,828,313 A | 8/1974 | Schull et al. |
| 3,836,768 A | 9/1974 | Clarke et al. |
| 3,838,272 A | 9/1974 | Bull |
| 3,882,465 A | 5/1975 | Cook et al. |
| 3,898,373 A | 8/1975 | Walsh |
| 4,001,769 A | 1/1977 | Fort et al. |
| 4,041,470 A | 8/1977 | Slane et al. |
| 4,063,220 A | 12/1977 | Metcalfe et al. |
| 4,068,105 A | 1/1978 | Jain et al. |
| 4,088,985 A | 5/1978 | Saito et al. |
| 4,156,112 A | 5/1979 | Moreland |
| 4,159,470 A | 6/1979 | Strojny et al. |
| 4,232,206 A | 11/1980 | Tooyama |
| 4,271,511 A | 6/1981 | Manber et al. |

*Primary Examiner*—Don N. Vo

(57) ABSTRACT

A data relay system transmits addresses from a host device sequentially to each of a plurality of data relays and for transmitting data sequentially through each of the plurality of data relays to the host device. Serial addresses are placed on the data bus by the host device and received by a Signal Conditioner in the data relay and passed through an Address Parallelizer and Address Selector. If the address is recognized by the Address Selector, then a Data Group is counted by the Data Group Counter while the Data Group is enabled. The enabling of a selected Data Group will result a selected parallel data being supplied to the Data Group Serializer which present the parallel data for serial transmission to the host device.

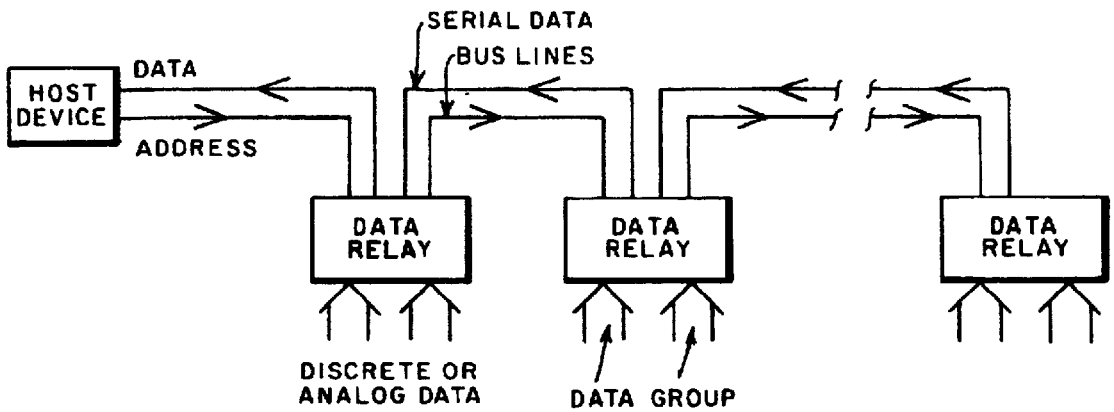

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

* * * * *